United States Patent
Di Biasio et al.

(10) Patent No.: US 10,077,852 B2
(45) Date of Patent: Sep. 18, 2018

(54) TORPEDO POWER CABLE GUIDE SYSTEM

(71) Applicants: Angelo Di Biasio, Narragansett, RI (US); William P Barker, Bristol, RI (US); Michael D Cullinane, South Kingstown, RI (US); John C. Babineau, Wakefield, RI (US)

(72) Inventors: Angelo Di Biasio, Narragansett, RI (US); William P Barker, Bristol, RI (US); Michael D Cullinane, South Kingstown, RI (US); Allan Laperche, Exeter, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/713,853

(22) Filed: Sep. 25, 2017

(65) Prior Publication Data
US 2018/0031148 A1 Feb. 1, 2018

Related U.S. Application Data

(62) Division of application No. 14/870,089, filed on Sep. 30, 2015, now Pat. No. 9,810,347.

(51) Int. Cl.
*E21F 17/02* (2006.01)
*F16L 3/00* (2006.01)
*F16L 3/18* (2006.01)
*F41F 3/10* (2006.01)
(Continued)

(52) U.S. Cl.
CPC ............... *F16L 3/18* (2013.01); *F16L 3/1091* (2013.01); *F41F 3/10* (2013.01); *F41F 3/055* (2013.01)

(58) Field of Classification Search
CPC ........ F16L 3/16; F41F 1/00; F41F 3/00; F41F 3/08; F41F 3/10; B63G 8/32; B63G 3/02
USPC ............ 248/49, 58, 62, 70, 73, 74.4, 228.5, 248/230.5, 231.61, 316.6; 73/158; 89/1.809, 1.81, 5; 114/238; 102/399
See application file for complete search history.

(56) References Cited

U.S. PATENT DOCUMENTS 5,799,907 A * 9/1998 Andronica ................ F16L 3/24 248/62
6,131,859 A * 10/2000 Giuliano ............... F16L 3/1016 24/279

(Continued)

*Primary Examiner* — Terrell L McKinnon
*Assistant Examiner* — Michael McDuffie
(74) *Attorney, Agent, or Firm* — James M. Kasischke; Michael P. Stanley

(57) ABSTRACT

A guide system for securing a torpedo pre-set power cable to move within a torpedo tube is provided. The guide system includes a longitudinal keeper and a guide assembly. The longitudinal keeper secures the power cable and includes a protrusion. A channel of the guide assembly connects to a Torpedo Mount Dispenser such that the channel receives the protrusion with the keeper sliding within and along a length of the channel. An alternate channel connects to a torpedo tube land and is configured to pivot to a stowed position and a deployed position where the channel is configured to receive the protrusion of the keeper such that the keeper slides within and along a length of the channel. When using each of the channels, the power cable can move within the torpedo tube when the protrusion of the keeper with the secured power cable slides within each channel.

3 Claims, 9 Drawing Sheets

(51) Int. Cl.
*F16L 3/10* (2006.01)
*F41F 3/055* (2006.01)

(56) References Cited

U.S. PATENT DOCUMENTS

| | | | | |
|---|---|---|---|---|
| 6,367,238 B1* | 4/2002 | Fischer | ............... | F16G 13/16 248/49 |
| 6,996,967 B2* | 2/2006 | Kobayashi | .......... | B60R 16/0215 174/72 A |
| 7,661,634 B2* | 2/2010 | Thompson | ......... | B65D 63/1072 24/274 R |
| 7,829,789 B2* | 11/2010 | Yamaguchi | .......... | B60N 2/0224 174/68.1 |
| 8,686,286 B2* | 4/2014 | Sekino | ............... | B60R 16/0215 174/50 |
| 8,763,648 B2* | 7/2014 | Senkpiel | ............... | F16L 59/123 138/149 |
| 9,546,744 B2* | 1/2017 | Patil | ..................... | F16L 3/24 |
| 9,810,347 B1* | 11/2017 | Di Biasio | ............... | F16L 3/18 |
| 2009/0127407 A1* | 5/2009 | Pothanikat | ............ | F16L 55/035 248/74.1 |
| 2009/0272856 A1* | 11/2009 | Azuma | ..................... | F16L 3/04 248/73 |
| 2009/0294600 A1* | 12/2009 | Dodge | ...................... | F16L 3/12 248/73 |
| 2011/0290948 A1* | 12/2011 | Benne | ...................... | F16L 3/11 248/58 |
| 2014/0224945 A1* | 8/2014 | Okuhara | ................ | H02G 3/30 248/74.1 |
| 2014/0263866 A1* | 9/2014 | Hemmer | ............... | F16M 13/00 248/58 |

* cited by examiner

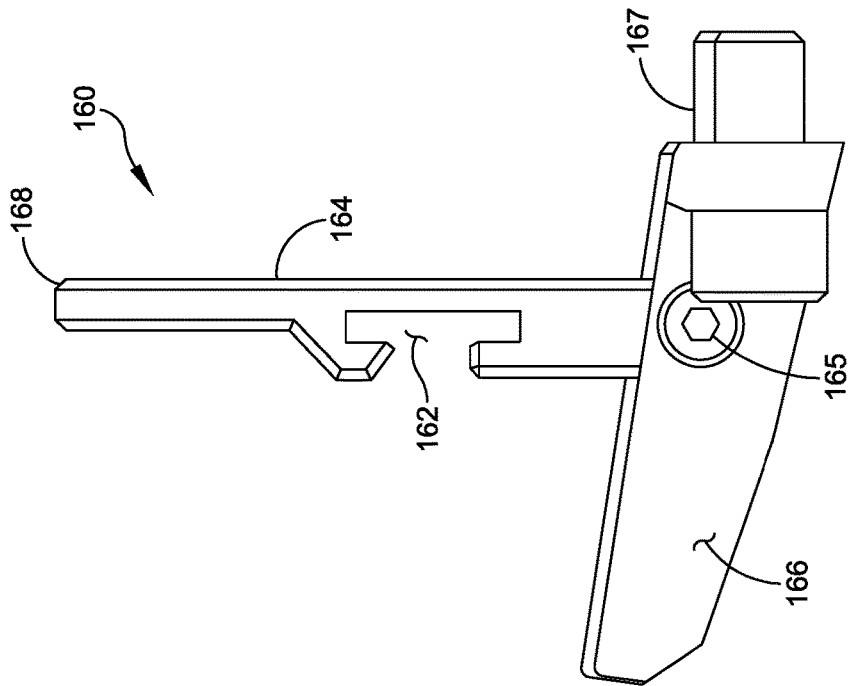
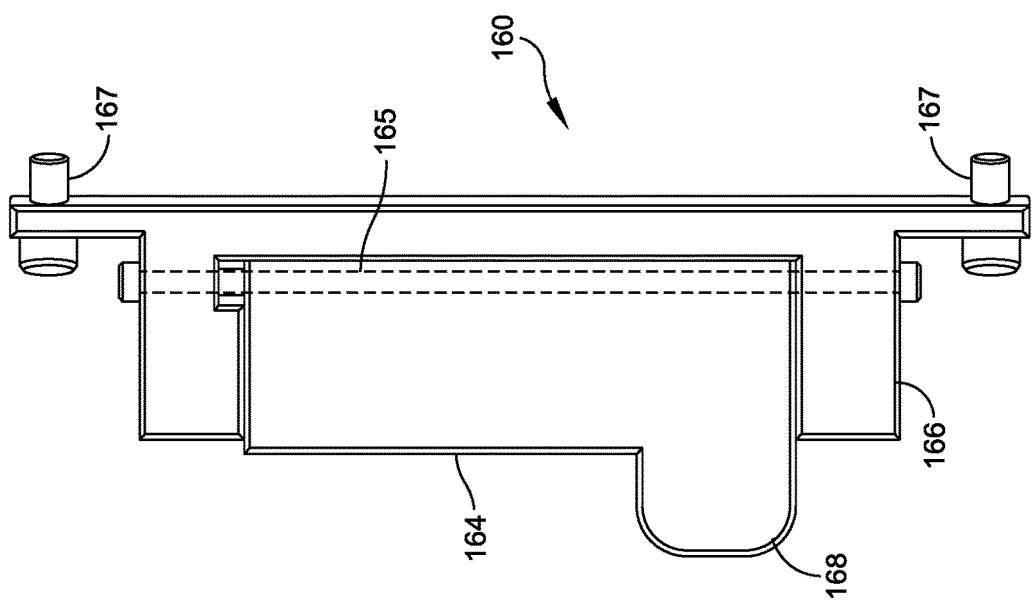

TORPEDO POWER CABLE GUIDE SYSTEM

The present application is a divisional application and claims the benefit of U.S. application Ser. No. 14/870,089 filed on Sep. 30, 2015 by the inventors Angelo Di Biasio, William P. Barker, Michael Cullinane and Alan Laperche with the invention entitled "Torpedo Power Cable Attachment Hardware".

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention relates to a guide assembly for a pre-set power cable used in a torpedo tube and in particular, to a guide assembly that prevents snagging of the power cable during insertion and removal of a torpedo from the torpedo tube.

(2) Description of the Prior Art

A torpedo pre-set power cable (also referred to as an A-cable) powers a torpedo prior to launch from a torpedo tube. The A-cable passes through an electrical penetrator of a torpedo tube breech door. Inside the torpedo tube, the A-cable is attached to a Torpedo Mounted Dispenser (TMD) via a series of hooks and retainers that secure the cable during separation from the torpedo (e.g., during launch). This securing action is necessary due to umbilical separation and the resultant loads that are encountered during a torpedo launch.

In various circumstances, the hooks and retainers can limit or provide excess slack in the A-cable. During loading and unloading of the torpedo from the torpedo tube; the slack can result in snagging the A-cable on the torpedo tube structure. This snagging can damage the A-cable and can impede the operation of other torpedo tube components. Thus, there is a need for an improved system to safely guide a torpedo pre-set power cable.

SUMMARY OF THE INVENTION

Accordingly, it is a primary purpose and general object of the present invention to provide a guide system that secures a torpedo pre-set power cable and prevents cable snagging during torpedo loading and unloading.

To attain the object of the present invention, the guide system provides a guide assembly that connects to the Torpedo Mounted Dispenser (TMD). The guide system also includes a longitudinal keeper that secures the torpedo pre-set power cable by encompassing and tightening down on the cable. A channel of the guide assembly is shaped to accommodate a protrusion of the longitudinal keeper.

When the protrusion is received in the channel; the keeper can slide along a length of the channel. As such, the keeper and channel define a mating track that permits loading and unloading of the torpedo by sliding the keeper within the channel along with the A-cable secured by the keeper. By controlling the keeper, the slack of the A-cable can be controlled. Controlling the A-cable slack substantially reduces snagging of the A-cable within the torpedo tube.

An alternate torpedo power cable guide system is provided. The guide system includes a guide assembly with a channel that connects to a torpedo tube at a lower longitudinal land of the tube. A section of the guide assembly including the channel can pivot to a stowed position or a deployed position to receive a protrusion of a longitudinal keeper. When the protrusion is in the channel; the keeper can slide along the channel length. The keeper and channel define a mating track that permits loading and unloading of the torpedo by sliding the keeper within the channel along with the A-cable secured by the keeper.

Other objects and advantages of the present invention will be apparent to those having ordinary skill in the art reading the instant specification, drawings, and appended claims.

BRIEF DESCRIPTION OF THE DRAWINGS

FIG. 8A is a top view of a channel of the alternate guide system shown in FIG. 7;

FIG. 8B is a side view of the alternate channel shown in FIG. 7;

DETAILED DESCRIPTION OF THE INVENTION

Generally, the present invention comprises a guide system with a longitudinal keeper which secures an A-Cable (torpedo pre-set power cable). The keeper is the mechanical attachment of a cover and a base having a protrusion. The system also comprises a guide assembly having a channel sized to accommodate and allow the protrusion to slide within the channel. The guide assembly is secured to a weldment of a Torpedo Mounted Dispenser (TMD). Alternatively, the channel can be mounted as a pivoting hinge plate with the guide assembly attached to a lower longitudinal land of the torpedo tube.

Figure 1:
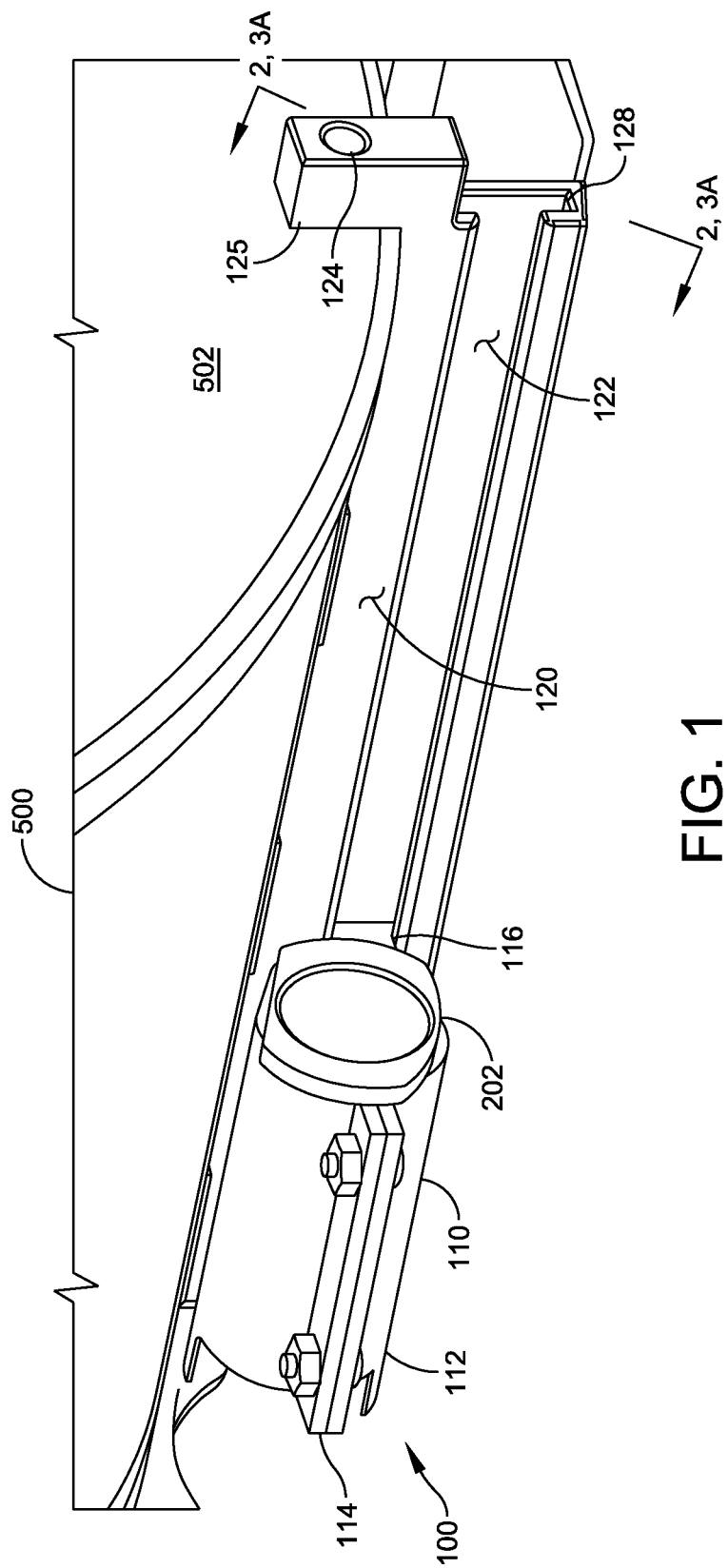
FIG. 1 is a perspective view of a pre-set power cable guide system of the present invention in which the guide system is attached to a Torpedo Mounted Dispenser (TMD)
Figure 2:
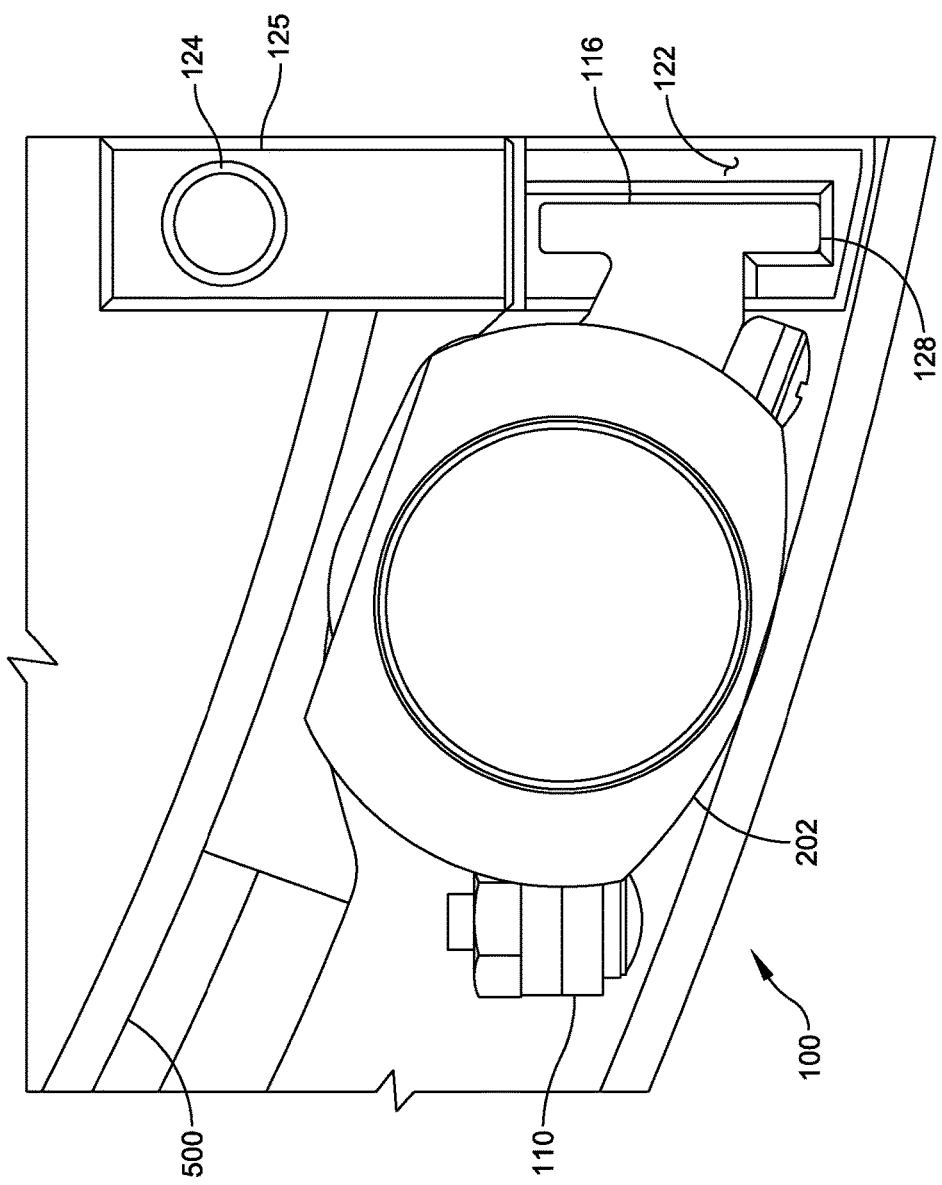
FIG. 2 is an end view of the power cable guide system based on reference lines 2-2 in FIG. 1.

Referring now to the drawings and more particularly to FIGS. 1 and 2, shown therein are perspective and end views of a guide system 100 of the present invention. The guide system 100 is shown installed with a Torpedo Mounted Dispenser (TMD) 500. The guide system 100 includes a longitudinal keeper 110 and a guide assembly 120 with a channel 122. The keeper 110 is configured to secure a pre-set power cable 200 via an opening in the keeper formed by attachment of a base 112 and a cover 114. An aft cable keeper 202 is shown as to where the cable 200 would be positioned.

The keeper 110 also includes a protrusion 116 as part of the base 112. The protrusion 116 can be partially shaped as a T-bolt. The guide assembly 120 securely mounts to the TMD 500 via a fastening mechanism (not shown) inserted through an aperture 124 on a track finger 125.

The channel 122 of the guide assembly 120 has a length that extends along a portion or a full length of the TMD 500. The channel 122 (having at least one end open) is configured to receive the protrusion 116 of the keeper 110 such that the keeper can slide along the length of the channel. The channel 122 is formed as a larger T-shaped indent to maintain a preferred orientation of the keeper 110 in relation to the TMD 500 as the keeper slides within the channel.

The TMD 500 may include a stud on the weldment back plate 502 and a fastener/screw internal to the weldment inside diameter to secure the channel 122 to the TMD. The load would be borne by the track finger 125 which protrudes behind the weldment back plate 502.

Figure 3A:
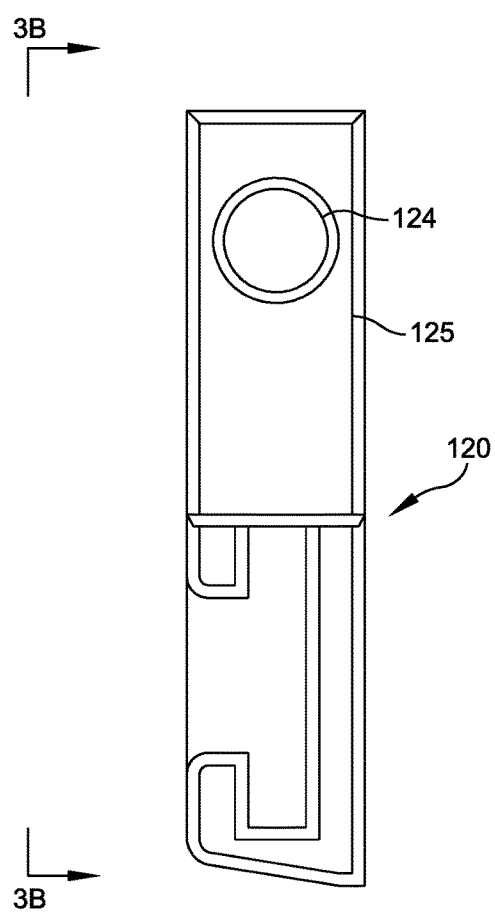
FIG. 3A is an end view of an exemplary channel based on reference lines 3A-3A in FIG. 1.
Figure 3B:
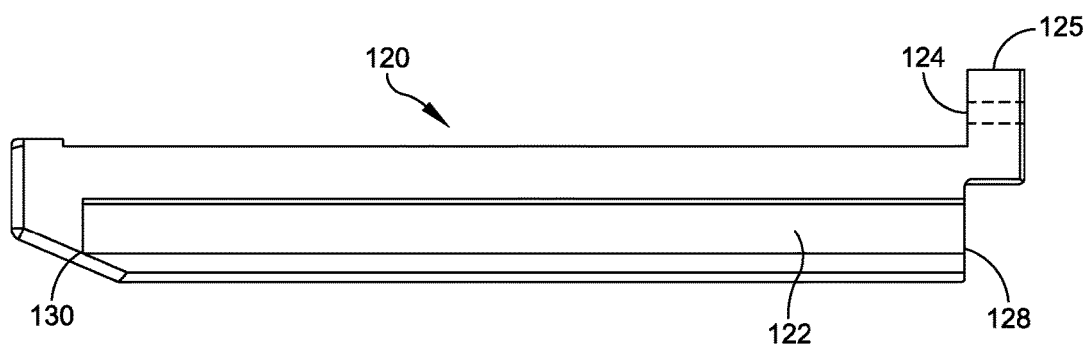
FIG. 3B is a side view of the guide assembly and channel based on reference lines 3B-3B in FIG. 3A.

FIGS. 3A and 3B respectively depict end and side views of the guide assembly 120. As previously stated, the guide assembly 120 is mounted to the TMD 500 via a fastening mechanism inserted through the channel aperture 124. The channel aperture 124 is formed in the guide assembly 120 and is sized and shaped to permit attachment via a screw, a rivet, etc.

The side view of FIG. 3B illustrates the T-shaped channel 122 extending along a length of the guide assembly 120. The channel 122 includes an open end 128 and a closed end 130. The keeper 110 is received into the channel 122 by sliding the protrusion 116 into the open end 128. The protrusion 116 can slide within the length of the channel 122 as defined by the closed end 130.

It is understood that interaction of the protrusion 116 and the channel 122 is not limited to implementation of a T-track system. The keeper 110 and the channel 122 can cooperate to form any mating track. Other exemplary components that may form the mating track include, but are not limited to, an open-face hinge/hinge pin or a drawer-slide mechanism. Generally, the mating track cooperates such that the torpedo pre-set power cable 200 can be installed during loading of a torpedo by sliding the mating track components together.

Figure 4:
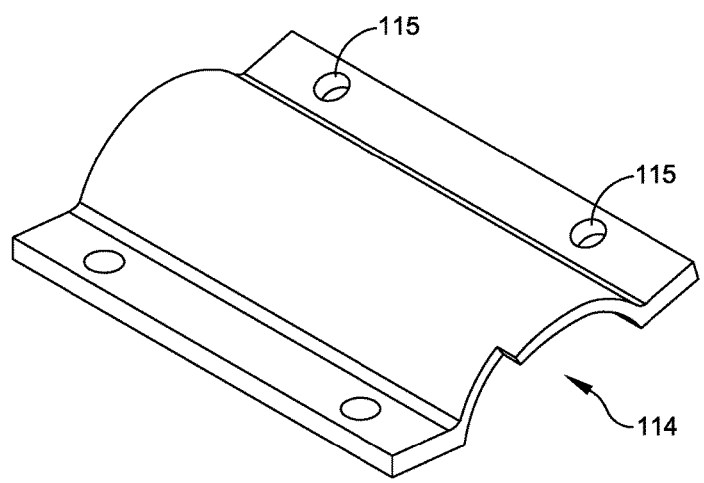
FIG. 4 is a perspective view of an exemplary cover for a longitudinal keeper of the cable guide system.
Figure 5A:
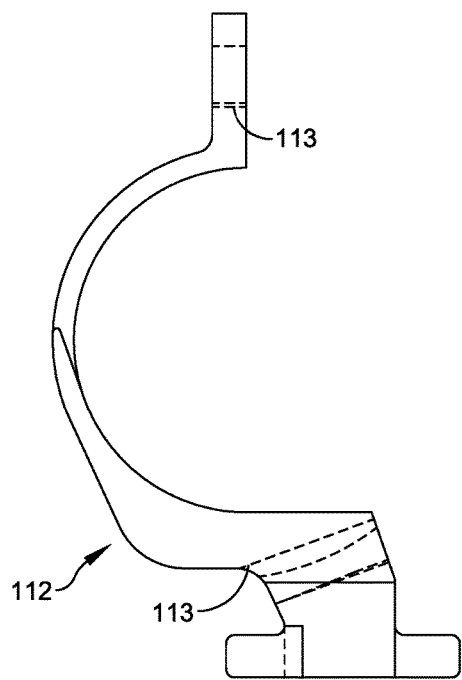
FIG. 5A is an end view of an exemplary base for the keeper.
Figure 5B:
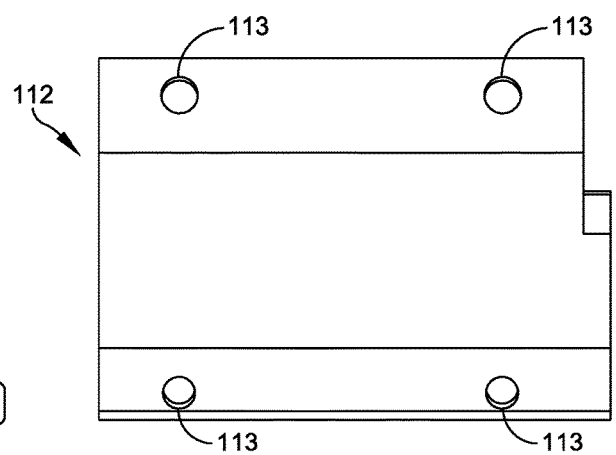
FIG. 5B is a side view of the base shown in FIG. 5A.
Figure 6:
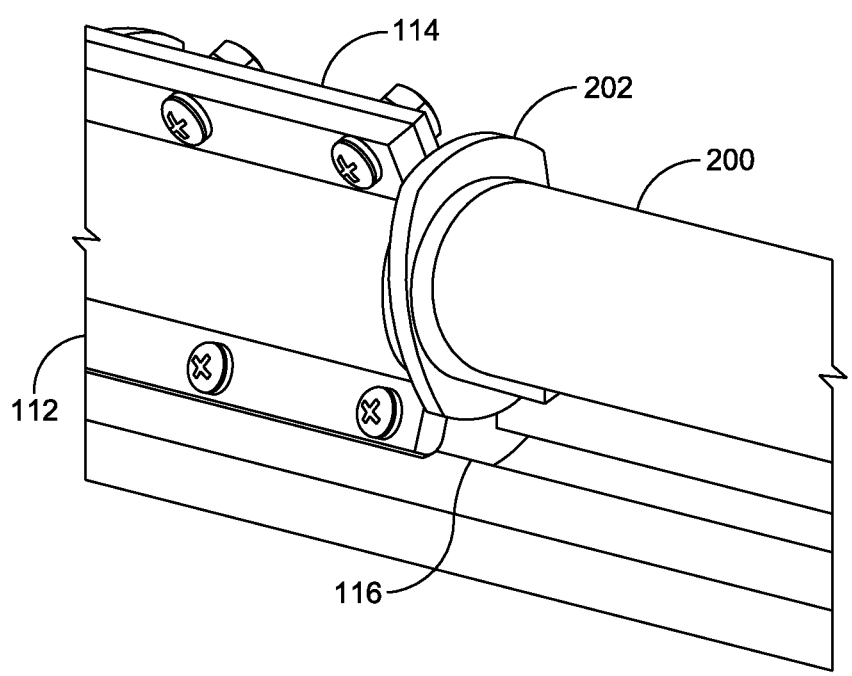
FIG. 6 is a perspective view of a torpedo pre-set power cable positioned between the cover and base of the keeper of the present invention.

Referring now to FIG. 4, FIG. 5A and FIG. 5B, a longitudinal keeper 110 is formed by a combination of the two components shown in the figures. FIG. 4 shows a perspective view of an exemplary cover 114 whereas FIG. 5A and FIG. 5B show end and side views of an exemplary keeper base 112. Generally, the base 112 and the cover 114 are sized and/or shaped to permit the power cable 200 to be positioned between an attached cover and base. When secured therein, the cable 200 is prevented from movement (See FIG. 6).

The keeper cover 114 includes a plurality of apertures 115 (only two apertures are labeled for clarity) that correspond and align to base apertures 113. The base 112 and the cover 114 are connected to form an integral component with the pre-set power cable 200 positioned therein via one or more fasteners (e.g., screws, bolts and nuts) inserted through the apertures 113/115 (See FIG. 2, as an example of an assembled nut and bolt configuration). In the configuration shown in FIG. 5A, the base 112 includes the protrusion 116 that is sized and shaped to be received in the channel 122.

It is understood that the keeper 110 as shown in FIG. 4, FIGS. 5A and 5B is not so limited. Alternatives provide that the keeper 110 be formed as an integral component of the torpedo pre-set power cable 200. That is, the keeper 110 can be formed as a unitary (e.g., molded) component of the A-cable 200 during manufacturing. In accordance with the other aspects, the two-component longitudinal keeper 110 herein illustrated secures an existing A-cable as part of a retrofit and upgrade process.

Figure 7:
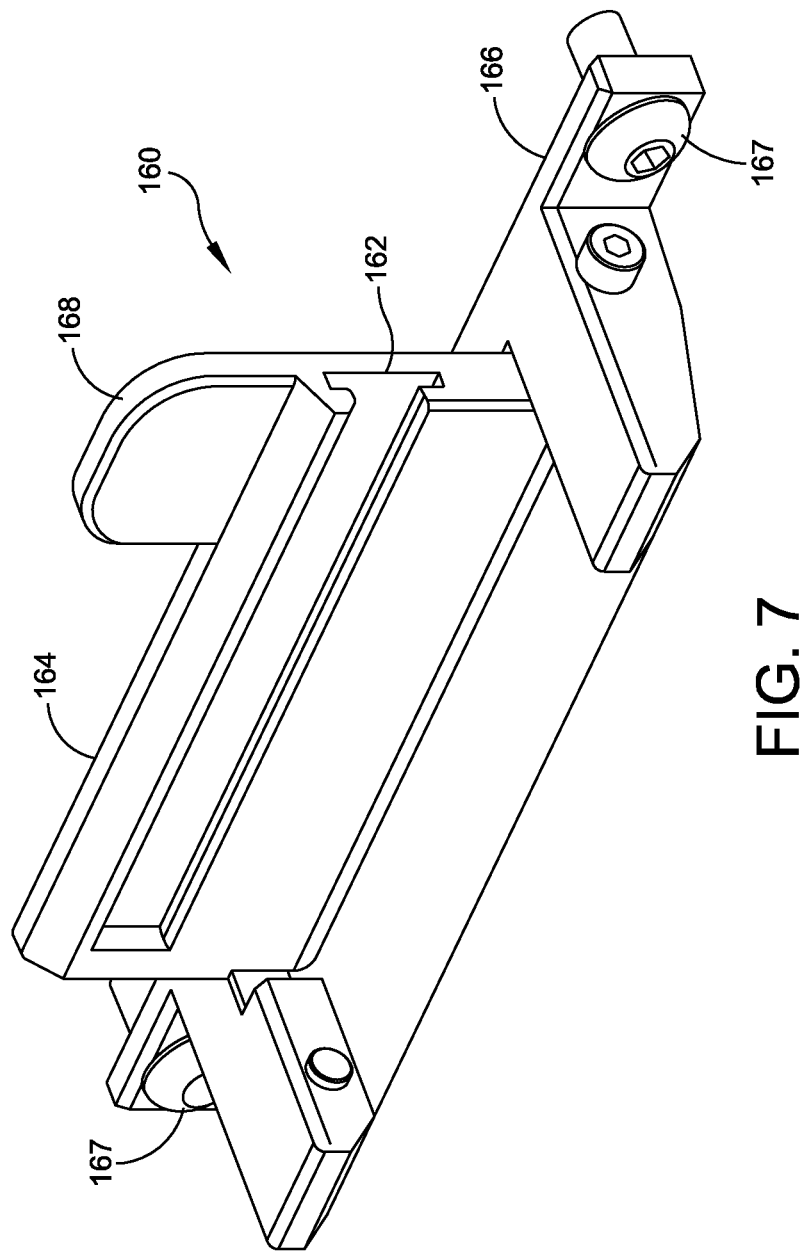
FIG. 7 is a perspective view of an alternate torpedo pre-set power cable guide system.

Turning to FIG. 7, shown therein is a perspective view on an alternate embodiment of a channel 162 of a torpedo pre-set power cable guide assembly 160. The channel 162 operates to mate with the longitudinal keeper 110.

Generally, the channel 162 includes a pivoting member 164 and a connecting member 166. The channel 162 connects to a torpedo tube via the connecting member 166. The connecting member 166 is mechanically connected to a lower longitudinal land 600 of the torpedo tube by fasteners 167 (See FIGS. 9 and 10).

The channel 162 of the pivoting member 164 is shaped to receive the protrusion 116 of the keeper 110. The pivoting member 164 rotates or pivots on a cylindrical axle 165 secured to the connecting member 166. The pivoting member can pivot to a stowed position where the channel 162 is not accessible (See FIG. 8A and FIG. 9) or a deployed position (shown in FIG. 7 and FIG. 8B) wherein the channel is positioned to receive the protrusion 116. When received therein, the keeper 110, connected to the torpedo pre-set power cable 200, can slide along at least a portion of the length of the guide assembly 160. When the pivoting member 164 is in the stowed position, the torpedo can move within the torpedo tube without contacting the channel 162.

The channel 162 is operable with the keeper 110 having the keeper cover 114 of FIG. 4 and the keeper base 112 of FIGS. 5A and 5B. Other aspects allow the channel 162 to be operable with a longitudinal keeper that is formed as a single (or unitary) component that can be permanently attached to the torpedo pre-set power cable 200. Similar to the guide assembly 100, the keeper 110 and channel 162 cooperate to determine the orientation of the torpedo pre-set power cable 200 along a length of the torpedo tube, or otherwise control the orientation of the cable to prevent snagging.

FIGS. 8A and 8B depict top and side views of the alternate guide assembly 160. In the top view of FIG. 8A, the channel 162 is in the stowed position wherein the pivoting member 164 is lowered to permit loading and unloading of the torpedo. The pivoting member 164 includes a tab 168 that assists a user to move the pivoting member between the stowed and deployed position. In the side view of FIG. 8B, the pivoting member 164 is shown in the deployed position in which the protrusion 116 of the keeper 110 can be inserted into the channel 162.

The alternate guide assembly 160 would only be used for a launch from a torpedo tube without a TMD 500. The pivoting member 164 of the guide assembly 160 would be in the stowed position when loading the torpedo. After the torpedo passes the alternate guide assembly 160, a torpedo person would raise the pivoting member 164 with the tab 168, and then slide the protrusion 116 into the channel 162 while further loading a torpedo into place.

Figure 9:
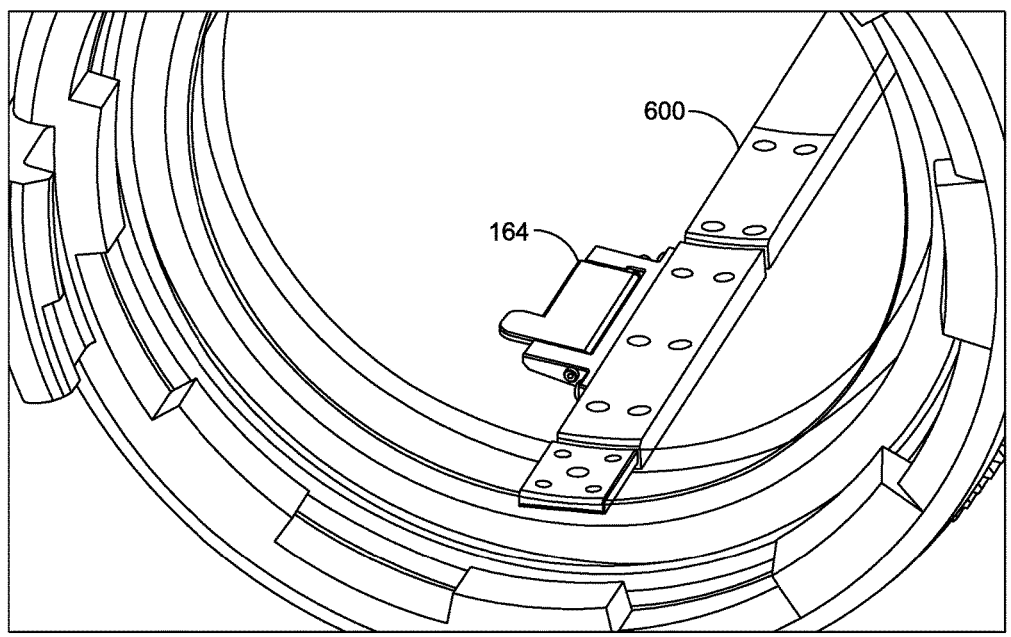
FIG. 9 is a perspective view of the alternate channel mounted in a torpedo tube.

Referring now to FIG. 9, shown therein is a perspective view of the alternate guide assembly 160 connected or mounted in a torpedo tube. As discussed, the connecting member 166 of the guide assembly 160 can be connected to a lower longitudinal land 600. The pivoting member 164 of the guide assembly 160 is shown in the stowed position.

Figure 10:
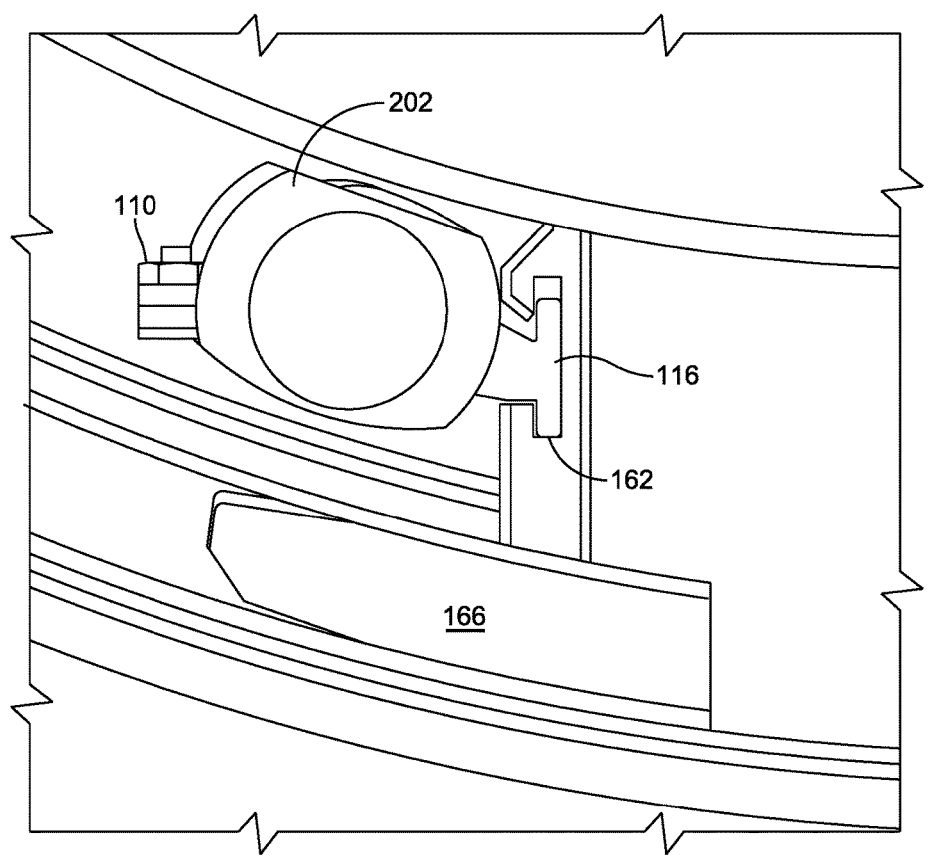
FIG. 10 is an end view of an alternate torpedo pre-set power cable guide system utilizing the channel of FIGS. 7-9.

Referring lastly to FIG. 10, shown therein is an end view of the alternate embodiment of a torpedo pre-set power cable guide assembly 160 including the channel 162. The guide assembly 160 includes the longitudinal keeper 110 having the protrusion 116 mating with the channel 162. The keeper 110 is configured to be connected to the torpedo pre-set power cable 200. The channel 162 includes the connecting member 166 and the pivoting member 164 pivoted to the deployed position.

The channel 162 has a length that extends along a portion of the torpedo tube. The channel 162 provides a mechanism that can mount to the torpedo tube lower longitudinal land 600 so that the A-Cable 200 is secured in the torpedo tube without the use of a TMD 500. In the stowed position, the channel 162 does not protrude into the circumferential clearance for weapon insertion. The pivoting track design orients the A-Cable 200 in the orientation as if attached to the TMD 500.

Once the tube is loaded, the torpedo is locked into the torpedo tube by a stop bolt mechanism. The TMD 500 is then unlocked from the torpedo, pulled back and fastened to the torpedo tube longitudinal lands 600 using TMD slide pad assembly pins. During TMD pull back, the longitudinal keeper 110 allows payout of cable slack from aft of the TMD 500 to forward of the TMD.

During a backhaul of a torpedo, the keeper 110 allows personnel to access the A-Cable 200 while side pad assemblies are released from the longitudinal lands 600 and the TMD 500 is pushed forward and locked to the torpedo. When the TMD 500 is pushed forward, the keeper 110 allows slack forward of the TMD to payout aft of the TMD. This action prevents the A-Cable 200 from snagging and tearing components of the torpedo tube.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A guide system for securing a torpedo pre-set power cable to move within a torpedo tube, said guide system comprising:
   a keeper formable by mechanical attachment of a cover having two rectangular sections with at least two apertures therethru a longitudinal face of each section and an arch therebetween longitudinal edges of said rectangular sections, said cover attachable to a base having a rectangular section with at least two apertures therethru a longitudinal face of said rectangular section of said base, said base including an arch with a first end integral to a longitudinal edge of said rectangular section of said base and a T-shaped protrusion with at least two apertures therethru parallel to the apertures of said rectangular section with said protrusion extending away from and integral to a second end of said arch;
   a plurality of fasteners for the mechanical attachment by the placement of said fasteners in the apertures of said cover and said base with interiors of said arches facing each other wherein the mechanical attachment is capable of securing the power cable therebetween said arches; and
   a guide assembly for attachment to a torpedo mounted dispenser of the torpedo tube wherein said guide assembly extends coincident to a length of the dispenser and includes a channel on a face of said guide assembly opposite the dispenser with said channel capable of accommodating said protrusion to slide within said channel;
   wherein the torpedo pre-set power cable can move within the torpedo tube when said protrusion of said keeper slides within said channel with the secured power cable.

2. The guide system in accordance with claim 1, wherein said channel is T-shaped larger than the T-shape of said protrusion such that a mating of said protrusion and said channel is capable of maintaining a prepositioned orientation of said protrusion.

3. The guide system in accordance with claim 2, wherein said channel has an open end and a closed end wherein said keeper can be received into said channel by sliding said protrusion into the open end.

* * * * *